United States Patent [19]

Lim

[11] Patent Number: 5,515,105
[45] Date of Patent: May 7, 1996

[54] VIDEO SIGNAL CODER USING VARIANCE CONTROLLED QUANTIZATION

[75] Inventor: Jong-Tae Lim, Seoul, Rep. of Korea

[73] Assignee: Daewoo Electronics Co., Ltd., Seoul, Rep. of Korea

[21] Appl. No.: 308,318

[22] Filed: Sep. 19, 1994

[30] Foreign Application Priority Data

Sep. 17, 1993 [KR] Rep. of Korea .................. 1993/18796

[51] Int. Cl.⁶ .................................................. H04N 7/30
[52] U.S. Cl. .................................................. 348/405
[58] Field of Search .................................. 348/405, 419, 348/390, 384; H04N 7/133, 7/13

[56] References Cited

U.S. PATENT DOCUMENTS

| | | | |
|---|---|---|---|
| 5,121,191 | 6/1992 | Cassereau et al. | 348/443 |
| 5,144,426 | 9/1992 | Tanaka et al. | 348/409 |
| 5,214,507 | 5/1993 | Aravind et al. | 348/390 |
| 5,333,012 | 7/1994 | Singhal et al. | 348/405 |
| 5,381,275 | 1/1995 | Nitta et al. | 360/48 |
| 5,452,104 | 9/1995 | Lee | 348/404 |

*Primary Examiner*—Tommy P. Chin
*Assistant Examiner*—Bryan S. Tung
*Attorney, Agent, or Firm*—Anderson Kill Olich & Oshinsky

[57] ABSTRACT

An apparatus for generating a quantization parameter for use in controlling a quantizer quantization size for use in the quantization of a video frame signal, which comprises: a first calculation circuit for receiving the video frame signal and calculating the variance of the entire video frame signal; a video slice generator for receiving the video frame signal and dividing the video frame signal into a predetermined array of video slices; a second calculation circuit for receiving the predetermined array of video slices and sequentially calculating the variance of each of the video slices; a third calculation circuit for receiving the variance of the entire video frame signal and the variance of the each of the video slices and calculating the spatial activity of each of the video slices; and a quantization control circuit, in response to the spatial activity of each of the video slices, for generating an adjusted quantization parameter corresponding to each of the video slices in order to perform a fine quantization in a video slice having a small spatial activity.

2 Claims, 2 Drawing Sheets

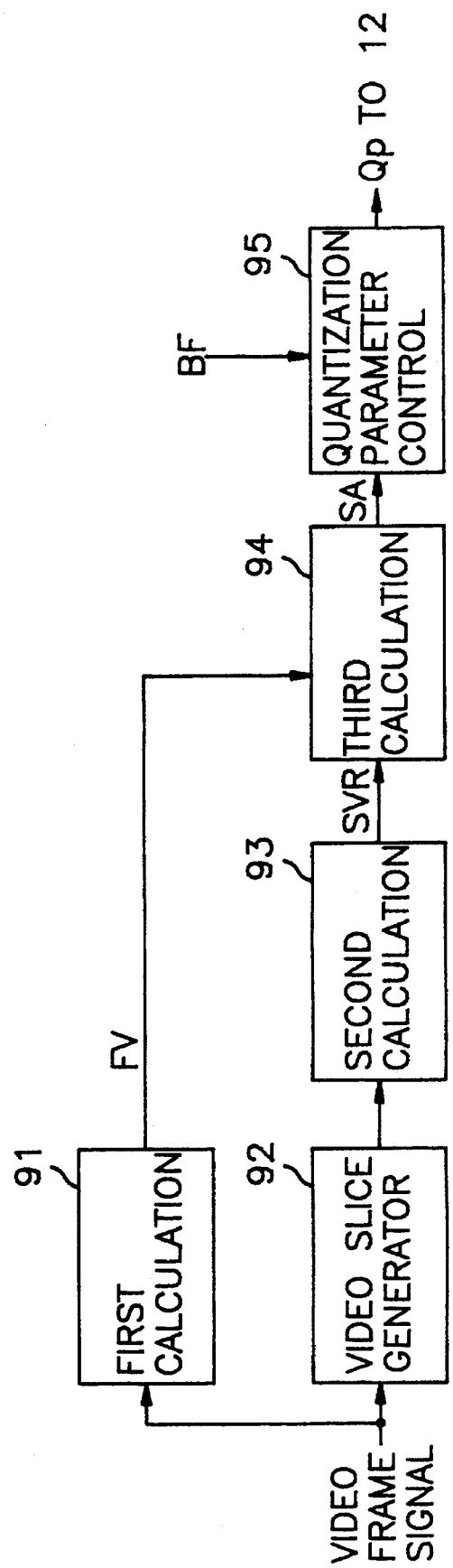

VIDEO SIGNAL CODER USING VARIANCE CONTROLLED QUANTIZATION

FIELD OF THE INVENTION

The invention relates to a video signal encoding apparatus; and, more particularly, to an apparatus for adaptively adjusting the step size of quantizing transform coefficients derived from a video frame signal to be transmitted in accordance with the local variance of a video frame signal, to thereby improve the quality of the transmitted video frame signal.

DESCRIPTION OF THE PRIOR ART

In various electronic applications such as high definition TV and video telephone systems, a video signal may be transmitted in a digital form. When the video signal comprising a sequence of video "frames" is expressed in a digital form, there occurs a substantial amount of digital data: for each line of a video frame is defined by a sequence of digital data elements referred to as "pixels". Since, however, the available frequency bandwidth of a conventional transmission channel is limited, in order to transmit the substantial amounts of digital data through the fixed channel, a video signal encoding apparatus is normally used to compress the digital data.

Conventional video signal encoding apparatus typically includes a transform coder, e.g., DCT (Discrete Cosine Transform) coder, which sequentially converts a plurality of blocks of, e.g., 8×8, pixels contained in a video frame signal into a plurality of blocks of 8×8 transform coefficients. This DCT coder is described in, for example, Chen and Pratt, "Scene Adaptive Coder", *IEEE Transactions on Communications, COM*-32, No. 3 (March 1984). The transform coefficient blocks are sequentially processed with a quantization circuit wherein they are converted into quantized data.

In the video signal encoding apparatus, the manner of quantizing the transform coefficient blocks, determines the bit rate of the encoded video frame signal and dictates the quality of the video frame signal reconstructed from that encoded video frame signal. The conventional quantization circuit, in order to carry out the quantization, includes a quantizer step size matrix whose quantization step size can be controlled by using a so-called quantization parameter as set forth in the video coding syntax of the Motion Picture Expert Group (MPEG) contained in the International Standards Organization (ISO) Standard Committee Draft 11172-2.

The quantization step size directly controls the bit rate of the encoded video frame signal and the coarseness/fineness of the quantization employed in developing the encoded video frame signal. That is, a smaller quantization step size entails a larger amount of data requiring a larger number of code bits for the representation thereof, whereas a larger quantization step size results in a lower volume of data needing a fewer number of code bits for their representation. And, a larger number of code bits can represent a video frame signal more precisely than a fewer number of code bits. Therefore, in order to achieve the maximum picture quality for a particular predetermined target bit rate, the quantization parameter need be appropriately selected.

However, in the prior art schemes described above, since such quantization parameter is determined on the basis of the complexity or variance of the entire video frame signal, it may be difficult to select an appropriate quantization step size especially when the variance or complexity of the video frame signal occurs locally.

SUMMARY OF THE INVENTION

It is, therefore, a primary object of this invention to provide an improved video signal encoding apparatus wherein a highly enhanced picture quality is attained by adaptively adjusting the quantization parameter in accordance with the local variance or complexity in a video frame signal.

In accordance with the invention, there is provided an apparatus for generating a quantization parameter, for use in a video signal encoding system having a transform coder for encoding a video frame signal on a block-by-block basis to generate an array of transform coefficient blocks, and a controllable quantizer, having a quantizer step size matrix, for sequentially quantizing the array of transform coefficient blocks to generate transform coded and quantized data, which comprises: first calculation means for receiving the video frame signal and calculating the variance of the entire video frame signal; means for receiving the video frame signal and dividing the video frame signal into a predetermined array of video slices; second calculation means for receiving the predetermined array of video slices and sequentially calculating the variance of each of the video slices; third calculation means for receiving the variance of the entire video frame signal and the variance of said each of the video slices and calculating spatial activity of each of the video slices; and means, in response to the spatial activity of said each of the video slices, for generating an adjusted quantization parameter corresponding to said each of the video slices.

BRIEF DESCRIPTION OF THE DRAWINGS

The above and other objects and features of the present invention will become apparent from the following description of preferred embodiments given in conjunction with the accompanying drawings, in which:

FIG. 2 is a detailed block diagram of the quantization parameter control circuit shown in FIG. 1.

DETAILED DESCRIPTION OF THE PREFERRED EMBODIMENTS

Figure 1:
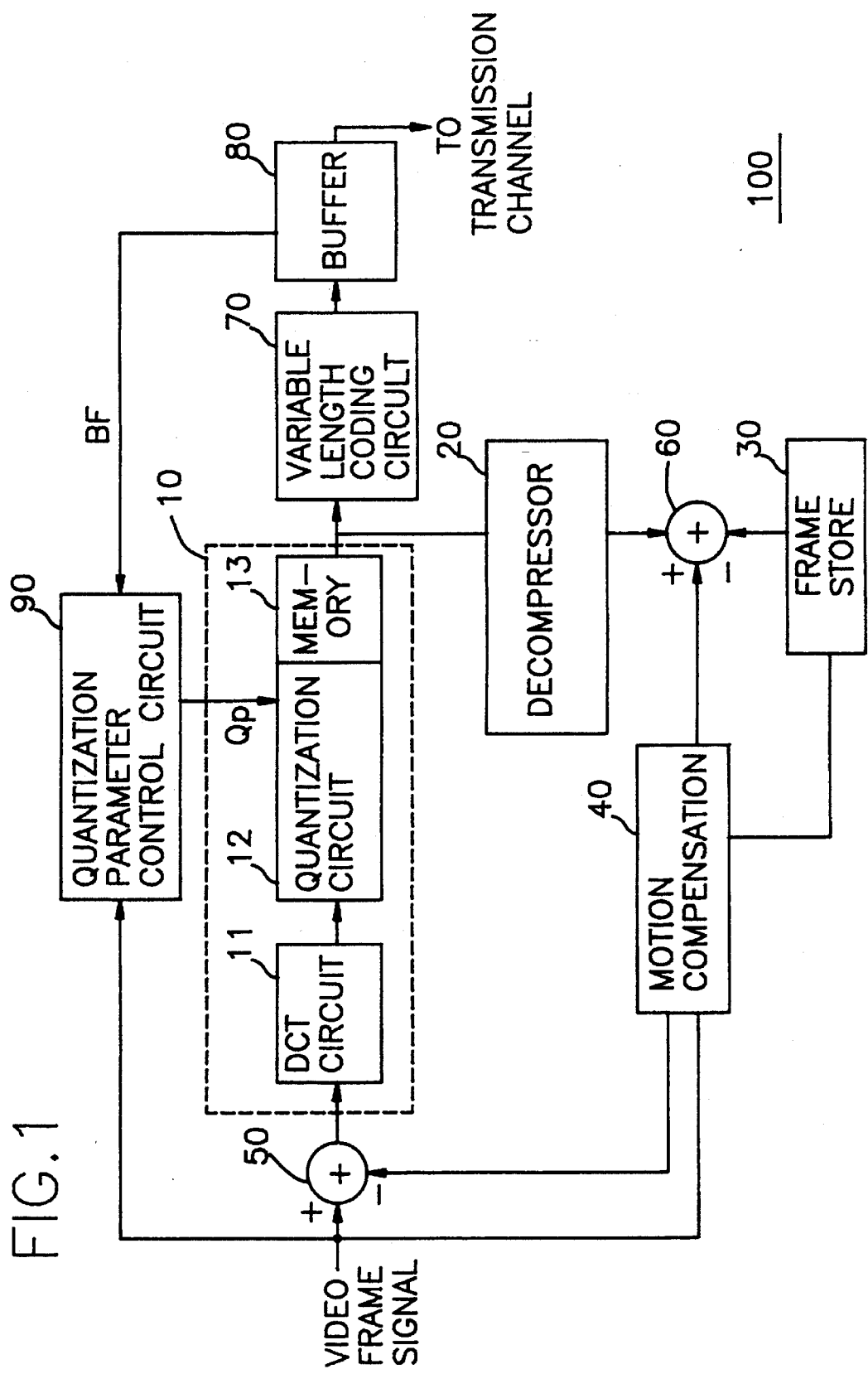
FIG. 1 is a schematic block diagram of a video signal encoding apparatus employing the quantization parameter control circuit in accordance with the present invention.

Referring to FIG. 1, there is shown a video signal coding apparatus employing the quantization parameter control circuit in accordance with the present invention. The video signal encoding apparatus eliminates redundancies in a video frame signal and/or between two video frame signals in order to compress the video frame signal to a more manageable size for transmission; and includes a differential pulse code modulation (DPCM) block 100 which has a compressor 10, a decompressor 20 and a motion compensation block 40. The compressor 10, as is well known in the art, employs a Discrete Cosine Transform ("DCT") circuit 11 and a quantization circuit 12, while the decompressor 20 employs an inverse quantization circuit and an inverse DCT circuit (not shown). The motion compensation block 40 is a conventional component used to predict a current video frame signal from a previous video frame signal. The video signal encoding apparatus also includes a known variable length coding circuit 70, a transmission buffer 80 and a quantization parameter control circuit 90.

The video frame signal is generated from a video signal source, e.g., video camera (not shown), and applied to a subtraction circuit 50 in successive blocks for the processing thereof on a block-by-block basis. Each block has a plurality of data elements, e.g., 8×8 pixels. The predicted video frame signal is extracted at the motion compensation block 40 and then coupled to the subtraction circuit 50, which generates a differential signal between the current video frame signal and the predicted video frame signal. The differential signal is transform coded and quantized at the compressor 10 to generate transform coded and quantized data. The transform coded and quantized data is then coupled to the conventional variable length coding circuit 70 which serves to generate the encoded video frame signal to be transmitted via the transmission buffer 80 to a receiver(not shown). On the other hand, the transform coded and quantized data is also coupled to the decompressor 20 wherein the transform coded and quantized data is converted back to the differential signal. The differential signal is then coupled to an adder circuit 60 wherein it is combined with the predicted video frame signal and reconstructed to a video frame signal identical to the video frame signal prior to its compression. The reconstructed video frame signal as the previous video frame signal is coupled through a frame store block 30 to the motion compensation block 40 for extracting the predicted video frame signal for processing a subsequent video frame signal. Therefore, the bit rate reduction is achieved by taking advantage of the fact that the differential signals are generally distributed over a small dynamic range and consequently can be represented by a smaller number of bits.

As is described above, the compressor 10 includes the DCT circuit 11 and the quantization circuit 12. The differential signal generated from the subtraction circuit 50 is coupled in successive blocks to the DCT circuit 11 which develops a plurality of blocks of 8×8 frequency domain coefficients, each block corresponding to a block of the differential signal. The blocks of 8×8 frequency domain transform coefficients are sequentially coupled to the quantization circuit 12.

The quantization circuit 12 has a memory 13 which stores a base quantizer step size matrix. The base quantizer step sizes, which are the elements of the base quantizer step size matrix, are arranged such that one base step size corresponds to one of the transform coefficients contained in each transform coefficient block (see International Standard Organization (ISO) standard Committee Draft 11172-2).

In addition to the transform coefficient blocks, the quantization circuit 12 also receives, from the quantization parameter control circuit 90, a quantization parameter Qp. The quantization circuit 12 uses the base quantizer step size matrix and the quantization parameter to generate the transform coded and quantized data, as the quantized version of the transform coefficient block, as its output. The actual quantization circuit step size to be employed for quantizing each coefficient of the transform coefficient block is developed by multiplying the value of the quantization parameter Qp with the respective base element of the base quantizer step size matrix.

In accordance with the present invention, the quantization parameter Qp is determined at the quantization parameter control circuit 90 which is shown in FIG. 2 in detail.

Referring to FIG. 2, the quantization parameter control circuit 90 includes a first calculation block 91, a video slice generator 92, a second calculation block 93, a third calculation block 94 and a quantization parameter control block 95.

The video frame signal is coupled to the first calculation block 91 in which the variance of the entire video frame signal FV is calculated using a known variance calculation algorithm. The variance of the video frame signal FV is then coupled to the third calculation block 94.

The video frame signal is also coupled to the video slice generator 92 in which the video frame signal is divided into a predetermined number, e.g., 60, of video slices, each of which includes a plurality of blocks of 8×8 pixels. Therefore, the pixels contained in a video slice are arranged in a matrix form. The video slices are sequentially coupled to the second calculation block 93.

At the second calculation block 93, the variance of each of the video slices, SVR, is calculated as follows:

$$SVR = \frac{1}{M \cdot N} \sum_{i=0}^{M} \sum_{j=0}^{N} (x(i,j) - AVG)^2 \tag{1}$$

wherein M is the number of the pixels located in a horizontal direction of a video slice and a positive integer; N is the number of the pixels located in a vertical direction of the video slice and a positive integer; AVG is means pixel value of the video slice; and x(.) is a pixel value.

The variance of each of the video slices SVR and the variance of the video frame signal FV outputted from the first calculation block 91 are coupled to the third calculation block 94. In the third calculation block 94, the spatial activity of each of the video slices SA is calculated as follows:

$$SA = (2 \times SVR + FV)/(SVR + 2 \times FV) \tag{2}$$

As may be seen from Eq. (2), when the variance of each of the video slices SVR is greater than that of the entire video frame signal FV, the spatial activity of the video slice SA is increased, while, the variance of the video slice SVR is smaller than that of the entire video frame signal FV, The spatial activity of each of the video slices SA is decreased. The spatial activity of each of the video slices SA is then coupled to the quantization parameter control block 95.

The quantization parameter control block 95 serves to determine an adjusted quantization parameter Qp using the spatial activity SA and a predetermined quantization parameter Q which, as is well known in the art, is initially controlled by using a buffer fullness signal BF outputted from the transmission buffer 80 shown in FIG. 1. The adjusted quantization parameter Qp is obtained as follows:

$$Qp = Q \times SA \tag{3}$$

As may be seen from Eq. (3), when the spatial activity of the video slice SA is increased, the adjusted quantization parameter Qp is increased, whereas the adjusted quantization parameter Qp is decreased with the decrease of the spatial activity of a video slice SA. The adjusted quantization parameter Qp is coupled to the quantization circuit 12, as described above.

On the other hand, since the actual quantization circuit step size to be employed for quantizing each coefficient of the transform coefficient block is developed by multiplying the value of quantization parameter Qp with the respective base element of the base quantizer step size matrix, if a video slice has a small spatial activity, the quantization circuit step size is decreased so that a very fine quantization can be executed on the video slice, perceiving even a small change in the intensity thereof. Similarly, if a video slice has a large spatial activity, the quantization circuit step size is increased so that a coarse quantization can be performed on the video slice.

As a result, therefore, it should be appreciated that, using the inventive video signal encoding apparatus, the overall subjective quality of a video frame signal can be enhanced since the coarse/fine quantization can be adaptively performed in accordance with a local change of the spatial activity: that is, a fine quantization is performed in an area where the human vision is more sensitive (i.e., a video slice having a small spatial activity), while a coarse quantization is performed in an area where the human vision is less sensitive (i.e., a video slice having a large spatial activity).

While the present invention has been described with respect to certain preferred embodiments only, other modifications and variations may be made without departing from the spirit and scope of the present invention as set forth in the following claims.

What is claimed is:

1. In a video signal encoding system including a transform coder for encoding a video signal comprised of a plurality of complete video frames on a block-by-block basis to generate an array of transform coefficient blocks, a controllable quantizer, having a quantizer step size matrix, for sequentially quantizing the array of transform coefficient blocks to generate transform coded and quantized data, and an apparatus for generating a quantization parameter for use in controlling the quantizer step size matrix, characterized in that said apparatus comprises:

first calculation means for receiving the video signal and calculating the respective variance of each complete video frame;

means for receiving the video signal and dividing each complete video frame into a predetermined array of video slices;

second calculation means for receiving the predetermined array of video slices and sequentially calculating the respective variance of each of the video slices;

third calculation means for receiving said respective variance of each complete video frame from said first calculation means and said respective variance of each of the video slices from said second calculation means and calculating the respective spatial activity of each of the video slices; and means, in response to said respective spatial activity of each of the video slices, for generating a respective adjusted quantization parameter for each of the video slices.

2. The apparatus of claim 1, wherein said spatial activity (SA) is calculated as follows:

$$SA = (2 \times SVR + FV)/(SVR + 2 \times FV)$$

wherein SVR is the variance of a given video slice and FV is the variance of the complete video frame corresponding to said given video slice.

* * * * *